United States Patent [19]
Gaalema et al.

[11] Patent Number: 5,101,108
[45] Date of Patent: Mar. 31, 1992

[54] SPLIT DYNAMIC RANGE USING DUAL ARRAY SENSOR CHIP ASSEMBLY

[75] Inventors: Steve D. Gaalema, Encinitas; Tom Y. Chuh, Vista, both of Calif.

[73] Assignee: Hughes Aircraft Company, Los Angeles, Calif.

[21] Appl. No.: 284,017

[22] Filed: Dec. 14, 1988

[51] Int. Cl.$^5$ .............................. G01J 1/02
[52] U.S. Cl. .................... 250/332; 250/330; 250/339
[58] Field of Search ............... 250/332, 330, 339

[56] References Cited

U.S. PATENT DOCUMENTS

| | | | |
|---|---|---|---|
| 3,781,558 | 12/1973 | Anderson | 250/332 |
| 3,902,066 | 8/1975 | Roosild et al. | 250/332 |
| 4,734,582 | 3/1988 | Gibbons et al. | 250/332 |
| 4,734,583 | 3/1988 | Wang et al. | 250/332 |

Primary Examiner—Mark Hellner
Attorney, Agent, or Firm—W. C. Schubert; W. K. Denson-Low

[57] ABSTRACT

An infrared sensing array having a detector array, a readout circuit, and processing circuitry. The detector array includes first and second subarrays having different sensitivities associated therewith for detecting different brightness level ranges. The sensitivities of the subarrays are determined by sensing circuit elements in the readout circuit. As a result of the subarrays of different sensitivities, the composite dynamic range covered by the array is greater than the individually dynamic ranges of the subarrays.

16 Claims, 2 Drawing Sheets

SPLIT DYNAMIC RANGE USING DUAL ARRAY SENSOR CHIP ASSEMBLY

BACKGROUND OF THE INVENTION

The disclosed invention is generally directed to infrared image sensing arrays, and is more particularly directed to an infrared image sensing array architecture having first and second subarrays respectively responsive to different brightness ranges.

Infrared image sensing arrays typically include an array of solid-state detector elements, commonly called pixels, arranged in rows and columns. Readout circuitry senses the amount of radiation received by the respective elements and provides output signals indicative of the received radiation. The outputs of the readout circuitry, which typically includes sensing circuits associated with the detector elements and output buffers, are provided to further circuitry for analog-to-digital conversion and processing.

Infrared image sensing arrays are commonly fabricated as hybridized detector/readout assemblies which include a generally planar integrated circuit detector assembly comprising the detector elements, and a generally planar integrated circuit readout circuit assembly comprising the sensing circuits and the readout buffers. The assemblies are mechanically secured to each other in layered fashion with appropriate electrical interconnection of the circuits on the respective assemblies. For example, the readout circuitry would include respective sensing circuits for each of the detector elements, and respective output buffers associated with the sensing circuits for each column, whereby the sensing circuit outputs for a given column would be multiplexed to the associated output buffer.

Ideally, infrared image sensing arrays would provide fast operation, dissipate little power and have a wide dynamic range. However, known implementations of infrared imaging arrays generally involve tradeoffs due to factors which cannot be avoided, including for example parasitic capacitances in the detector array itself as well as in the connecting wires that couple the readout outputs to the analog-to-digital conversion circuitry. Faster speed and/or greater dynamic range requires more power, which in turn requires more cooling capacity. Greater dynamic range further requires more complex processing components. The implications of greater power and cooling requirements are significant in applications such as missile or satellite carried infrared image sensing arrays.

SUMMARY OF THE INVENTION

It would therefore be an advantage to provide a infrared image sensing array which operates at high speeds with low power dissipation.

Another advantage would be to provide an infrared image sensing array which provides for wide dynamic range with low power dissipation.

A further advantage would be to provide an infrared image sensing array which provides high speed operation and wide dynamic range with low power dissipation.

The foregoing and other advantages are provided by the invention in a scanned detector array that includes a first subarray having a single column of detector elements oriented orthogonally to the image scan direction and a second subarray having a plurality of columns of detector elements parallel to the single column subarray. The first subarray has a first sensitivity associated therewith and is dedicated to imaging bright objects, while the second subarray has a second sensitivity associated therewith greater than the first sensitivity and is dedicated to imaging dim objects. The output of the first subarray is appropriately multiplied to compensate for the difference in sensitivities to provide similarly scaled outputs. As a result of the dual arrays, the composite dynamic range covered by the array is greater than the individual dynamic ranges of the subarrays.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
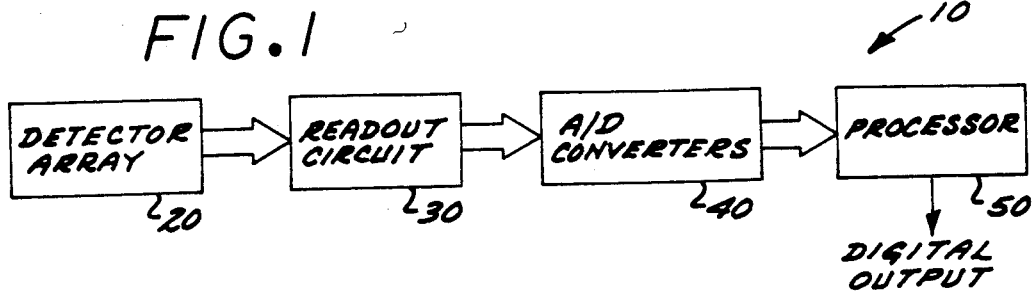
FIG. 1 is a block diagram of an imaging system in which the imaging array of the invention can be used.

In the following detailed description and in the several figures of the drawing, like elements are identified with like reference numerals.

Figure 2:
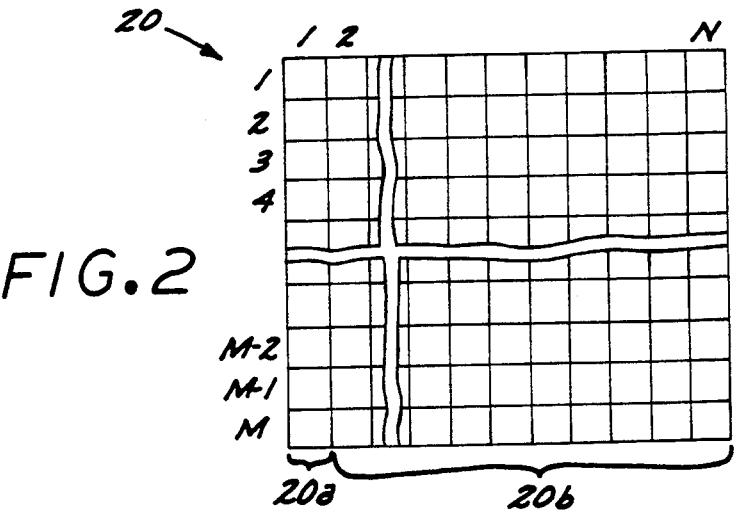
FIG. 2 is a schematic illustration of the organization of the detector elements of the imaging array of the invention.

Referring now to FIG. 1, shown therein is a block diagram of a scanning infrared image sensing system 10 that includes an infrared detector array 20 comprising, for example, a semiconductor detector array having detector elements arranged in rows and columns, as schematically illustrated in FIG. 2. A readout circuit 30 includes sensing circuits for sensing the amount of radiation incident on the detector elements, and further includes output buffers for amplifying the outputs of the sensing circuits.

Figure 3:
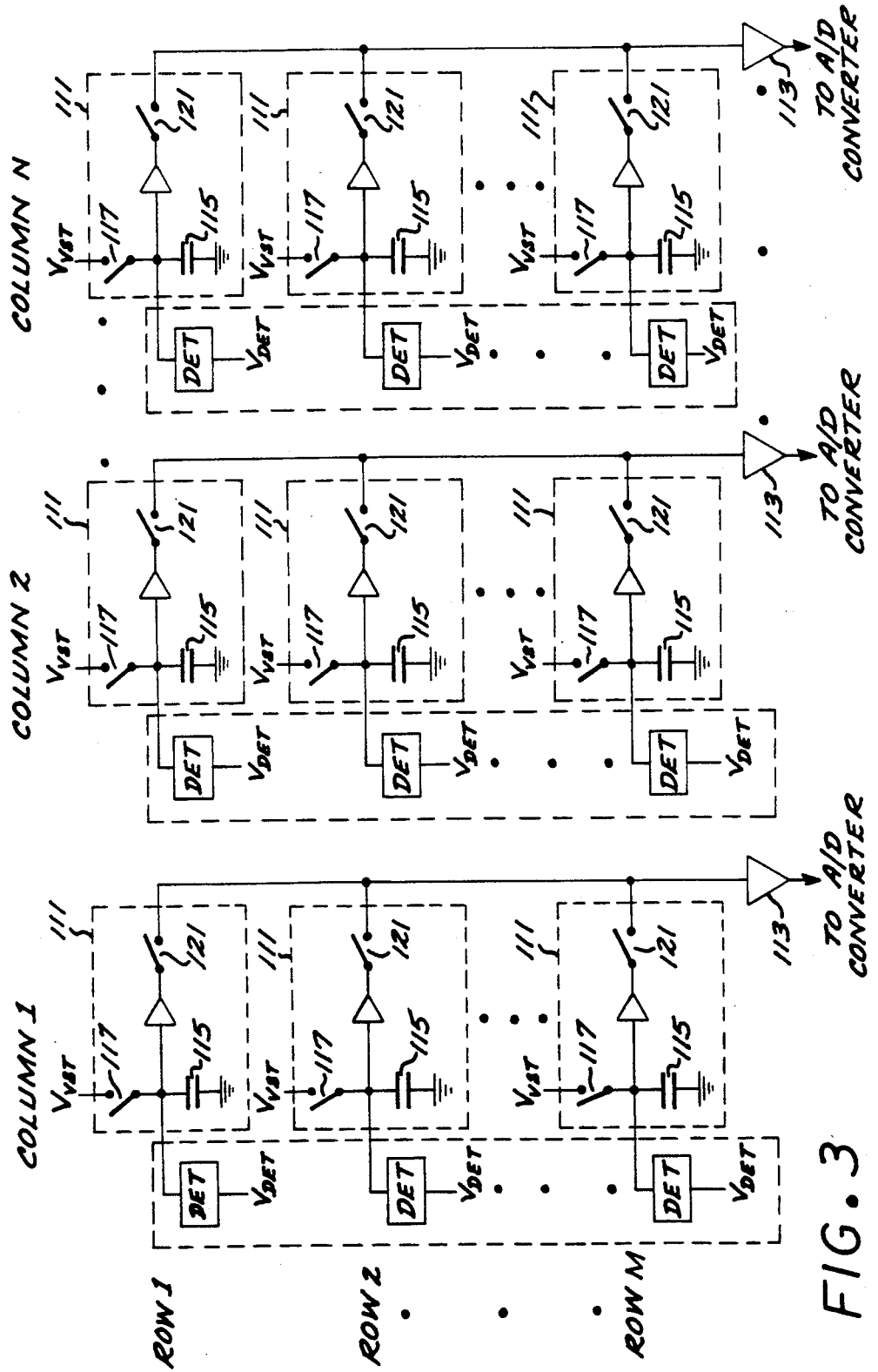
FIG. 3 is a schematic diagram of the readout circuit of the imaging system of FIG. 1.

Referring to FIG. 3, schematically illustrated therein by way of example is specific circuitry of the readout circuit 30. Respective sensing circuits 111 comprising a sense capacitance 115, a reset switch 117, a buffer 119 and an enable switch 121 are provided for each of the detector elements of the array 20. The sensing circuit outputs for a given column are multiplexed to an associated output buffer 113, as schematically indicated by the enable switches 121 in the sensing circuits 111, whereby the readout circuit 30 provides one output for each of the columns of the detector array 20. The operation of the sensing circuits 111 will be discussed in more detail further herein.

Referring again to FIG. 1, the column outputs of the readout circuit 30 are provided to respective analog-to-digital (A/D) converters 40 which convert the analog inputs to digital detector signals. The digital detector signals provided by the A/D converters 40 are processed by a processor 50.

Referring now to FIG. 2, schematically shown therein is the matrix arrangement of the detector elements (pixels) of the scanned detector array 20. Specifically, the detector elements are arranged in rows 1 through M and columns 1 through N. By way of example, M can be 20 while N can be 64. As is well known to skilled persons, with a scanning system, the image and the detector array are in relative motion whereby the image moves in the scan direction relative to the detector array. By way of example, the scan direction of the detector array of FIG. 2 can be considered as being from left to right. Scanning is achieved by moving the optical elements (e.g., a telescope), by moving the detector array 20 relative to the optical elements, or by moving the detector array and associated optical elements together relative to the scene being imaged (e.g., a rotating satellite).

The disclosed invention contemplates that the detector array 10 be divided into two subarrays having different sensitivities associated therewith. Specifically, the elements of column 1 comprise a single column subarray 20a dedicated to sensing bright images, while the elements of the remaining columns 2 through N comprise a multi-column subarray 20b dedicated to sensing dimmer images. The sensitivity of the elements of the single column subarray 20a are a fraction of the sensitivity of the remaining elements. In other words, a given readout output level for the single column subarray 20a indicates a brighter image than a readout output of the same level for the multi-column subarray 20b. As discussed more fully herein, the difference in sensitivity is compensated by the processor 50 by multiplying the digital detector outputs for the subarray 20a by a scaling factor equal to the inverse of the ratio of sensitivity between the elements of the single column subarray 20a and the elements of the multi-column subarray 20b. For the example to follow, the single column subarray 20a is 1/64 as sensitive as the multi-column subarray 20b, and accordingly the multiplication factor is 64.

By way of example, with reference again to the readout circuit of FIG. 3, the relative sensitivities of the detector elements of the subarrays 20a, 20b can be controlled by selection of the relative values of the respective sense capacitances 115 utilized for sensing the respective amplitudes of the radiation incident upon the respective detector elements. As is well known, sense capacitance node sensing involves momentarily closing the reset switch 117 to apply a predetermined reset voltage $V_{rst}$ to the sense node of the sense capacitor 115 which is in parallel with its associated detector element. Closure of the reset switch 117 causes the sense capacitor 115 to be charged to the predetermined voltage $V_{rst}$, and opening of the reset switch 117 allows the sense capacitor 115 to discharge through its associated detector element. The rate of discharge is a function of the radiation incident on the detector element, and sampling the sense node voltage after a fixed predetermined time delay following the opening of the reset switch provides a voltage indicative of the amplitude of the incident radiation.

The sensitivity associated with the detector elements of the single column subarray 20a is made less sensitive by providing associated sense capacitances 115 that are larger than those associated with the remaining detectors, for example, 64 times as large. With present imaging systems wherein the detector array 20 and the readout circuit 30 are hybridized, the sense capacitors advantageously comprise parasitic capacitances in the detector array 20 and in the readout circuit 30. In order to achieve the appropriate size sense capacitances for the detectors in the subarray 20a, additional capacitors can be provided in the readout circuit 30.

As another example, where the sensing circuits for the detector elements comprise known capacitive transimpedance amplifiers, the sensitivity associated with a given detector element can be reduced by providing a larger feedback capacitor.

In essence, the respective sensitivities associated with the subarrays 20a, 20b are established by controlling the respective gains of their associated readout circuits, i.e., the sensing circuits and output buffers. It should be appreciated that the subarrays 20a, 20b can utilize different sensing circuit types, so long as the gains associated with their readout circuits are adjusted to establish the desired sensitivity ratio.

Figure 4:
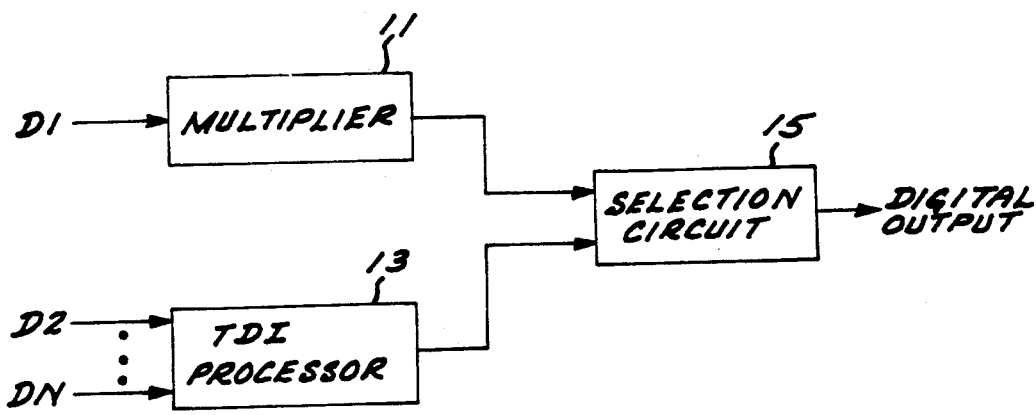
FIG. 4 is a block diagram of the processor of the imaging system of FIG. 1.

Referring now to FIG. 4, shown therein is a block diagram of the elements of the processor 50 which includes a multiplier 11 for receiving the digital detector output D1 associated with the single column subarray 20a of the detector array, and a time delay integration (TDI) processor 13 for receiving the digital detector outputs D2 through DN associated with the multi-column subarray 20b of the detector array 20.

The multiplier 11 multiplies the digital detector output D1 by the scaling factor discussed above so that the multiplier output is properly scaled to the other digital detector outputs to compensate for the reduced sensitivity of the detector elements of the single column subarray 20a. The TDI processor 13 processes the digital inputs for the columns of the multi-column subarray 20b pursuant to known techniques whereby dim images can be detected and distinguished as to relative brightness. As is well known, TDI processing requires outputs from a plurality of columns in a scanned detector array and provides an averaged output indicative of a single scanned column of detectors. In other words, digital detector outputs of the same portion of the image being scanned as sequentially imaged on the columns of the multi-column subarray 20b are averaged to provide what is effectively a single column output.

The outputs of the multiplier 11 and the TDI processor 13 are provided to a selection circuit 15 which provides an output that corresponds to the output of the multiplier 11 only when the output of the TDI processor 13 is saturated (i.e., at its maximum), which indicates that the particular portion of the image being processed is bright and out of the range of the more sensitive subarray 20b.

Thus, the output of the selection circuit 15 is effectively a single column of the scene being detected where each pixel is represented by either a TDI output or an output from the single column subarray, depending on brightness.

A specific example will now be discussed to facilitate understanding of the advantages provided by the dual sensitivity array. Assume that a dynamic range of $2^{16}$ (65536) is required. This total range is provided by choosing a dynamic range for each of the subarrays 20a, 20b that is less than the required dynamic range, for example, $2^{10}$ which is 1/64 that of the required range. Since the maximum brightness level is $2^{16}$, the sensitivity of the single column subarray must be 1/64 the sensitivity of the multi-column subarray 20b so that the maximum readout output for the single column subarray 20a represents the brightness level $2^{16}$. The scaling factor applied by the processor 50 is 64, which is the inverse of the sensitivity ratio 1/64. Thus, the multi-column subarray 20b, covers 1/64 of the brightness range, but has 64 times more brightness resolution than the single column subarray 20a, which resolution is needed to discriminate dim images based on brightness.

In comparison with conventional single sensitivity arrays, the disclosed multiple sensitivity array reduces power consumption and reduces power dissipation. The reduction in power consumption allows for smaller power supplies, while the reduction in power dissipation allows for reduced cooling capacity. Much of the reductions in power consumption and power dissipation are relative to the unavoidable parasitic load capacitance imposed by the output lines coupled to the outputs of the readout circuit 30, and such reductions can be quantified as follows.

As to power consumption, the 1/64 reduction in dynamic range permits a reduction of 1/64 in the voltage output of the readout circuit. This means a possible power reduction by a factor of $1/64^2$ due to the reduction in the $CV^2$ charging of the parasitic load capacitance.

As to power dissipation, the column output buffers typically dissipate the most power in the form of heat. If the output voltages of the buffers are reduced by a factor of 1/64, charge stored on the parasitic load capacitances is reduced by a factor of 1/64, which requires 1/64th the current. Since power dissipation of the buffers is voltage multiplied by current, and since the supply voltage across the buffers is generally not changed, power can be reduced by a factor of 1/64.

As a further result of lower readout output voltages, faster operation can be achieved. Specifically, the parasitic load capacitances at the outputs of the readout circuit 30 must be charged and discharged as the output voltages transition from one value to the next. With lower readout output voltages, such slew time (transition time) decreases, and the output voltages can be changed faster.

A further advantage of the dual sensitivity array is the ability to use less accurate analog-to-digital converters, which reduces cost as well as power requirements since power consumption increases with increased accuracy. For the above example, 10-bit converters would be used instead of 16-bit converters for conventional single sensitivity arrays.

It should be noted that the power and speed advantages of the dual sensitivity array are achieved at the cost of fewer quantization levels for bright objects. However, quantization levels provided by the dual sensitivity array have been determined to be sufficient since conventional single sensitivity arrays quantify bright objects more accurately than needed.

In the foregoing example of a dual sensitivity array having respective dynamic ranges of the $2^{10}$, the multiple column array is utilized for brightness levels 1 through 1024. The single column array is utilized for brightness levels 1025 through 65536, in increments of 64. In other words, each of the possible digital outputs provided by the A/D converter 40 for the single column subarray 20a, which for convenience can be called quantums, has an uncertainty of 64 brightness levels. That uncertainty is greatest at lowest quantum level for which the single column subarray is utilized, quantum level 17 (i.e., the output of the A/D converter is $17_{10}$), which represents brightness levels 1025 through 1088. The maximum percentage error for that quantum level would be 64/1025 or 6 percent, which in many systems, should be acceptable. The percentage error decreases with increasing brightness levels. At the lowest brightness level represented by the highest quantum level of 1024, which represents brightness levels 65473 through 65536, the maximum percentage error is 64/65473 or less than 1 percent.

It should be appreciated that since the dual array detector architecture is capable of providing a composite 16-bit dynamic range with two subarrays of 10-bit dynamic range each, two subarrays of greater than 10-bit dynamic range can provide a composite dynamic range of greater than 16-bits. Such an extended range system would provide increased dynamic range for brighter images, but the dim image resolution would be the same.

It should further be appreciated that more than two subarrays could also be utilized, for example to achieve greater resolution at the lower brightness levels covered by the bright image, single column subarray.

The foregoing has been a disclosure of an infrared image sensing detector array architecture that provides extended dynamic range with low power consumption and high speed operation. Further advantages include reduced processing accuracy, smaller circuit sizes, and increased reliability.

Although the foregoing has been a description and illustration of specific embodiments of the invention, various modifications and changes thereto can be made by persons skilled in the art without departing from the scope and spirit of the invention as defined by the following claims.

What is claimed is:

1. A detector array for a scanning image sensing system wherein the array is scanned, comprising:
   a first subarray of detector elements having a first sensitivity associated therewith, said detector elements being arranged to be scanned by the complete image being scanned;
   a second subarray of detector elements having a second sensitivity greater than said first sensitivity, said detector elements being arranged to be scanned by the complete image being scanned; and
   means for establishing said first and second sensitivities including means for detecting the amount of radiation received by the detector elements.

2. The detector array of claim 1 wherein said first subarray comprises a column of detector elements oriented orthogonally to the image scan direction.

3. The detector array of claim 2 wherein said second subarray comprises a plurality of columns of detector elements parallel to said first subarray column of detector elements.

4. The detector array of claim 1 wherein said detecting means comprises a sense node sensing circuit.

5. The detector array of claim 1 further including means for scaling the output of said first subarray to compensate for the difference between said first and second sensitivities.

6. The detector array of claim 5 wherein said means for scaling includes a multiplier.

7. A detector array for a scanning image sensing system wherein the array is scanned, comprising:
   a first subarray having a single column of detector elements oriented orthogonally to the image scan direction and having a first sensitivity associated therewith;
   a second subarray having a plurality of columns of detector elements parallel to said single column and having a second sensitivity associated therewith, said second sensitivity being greater than said first sensitivity by a factor X; and
   scaling means responsive to said first and second subarrays for multiplying the outputs of said first subarray by said factor X to compensate for the difference between said first and second sensitivities.

8. The detector array of claim 7 further including means for time delay integrating the outputs of said second subarray.

9. The detector array of claim 8 further including selection means for providing a selection output that includes (a) the output of said time delay integrating means when such output is not saturated, or (b) the output of said scaling means when the output of said time delay integrating means is saturated.

10. A scanning imaging array comprising:
a first subarray of detector elements;
first readout means for detecting the amount of radiation detected by said first subarray and having a first gain associated therewith;
a second subarray of detector elements;
second readout means for detecting the amount of radiation received by said second subarray and having a second gain associated therewith, wherein the ratio of said second gain to said first gain is R; and
means for scaling the output of said first readout means to compensate for the difference in gain between said first and second readout means.

11. The imaging array of claim 10 wherein said first subarray comprises a column of detector elements oriented orthogonally to the image scan direction.

12. The imaging array of claim 11 wherein said second subarray comprises a plurality of columns of detector elements parallel to said first subarray column of detector elements.

13. The imaging array of claim 12 wherein said first readout means comprises a sense node sensing circuit for each of the detector elements of said first subarray, and wherein said readout means comprises a sense node sensing circuit for each of the detector elements of said second subarray.

14. The imaging array of claim 10 wherein said means for scaling includes a multiplier for multiplying the output of said first readout means by a factor of R.

15. The imaging array of claim 10 further including means for time delay integrating the outputs of said second readout means.

16. The detector array of claim 15 further including selection means for providing a selection output that includes (a) the output of said time delay integrating means when such output is not saturated, or (b) the output of said scaling means when the output of said time delay integrating means is saturated.

* * * * *